United States Patent
Lee et al.

(10) Patent No.: US 11,450,908 B2
(45) Date of Patent: Sep. 20, 2022

(54) BATTERY MODULE HAVING PATH THROUGH WHICH COOLANT INTRODUCED THEREIN FLOWS WHEN THERMAL RUNAWAY OCCURS, AND BATTERY PACK AND ESS COMPRISING THE SAME

(71) Applicant: LG CHEM, LTD., Seoul (KR)

(72) Inventors: Jin-Kyu Lee, Daejeon (KR); Soo-Han Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/972,839

(22) PCT Filed: Apr. 1, 2020

(86) PCT No.: PCT/KR2020/004477
§ 371 (c)(1),
(2) Date: Dec. 7, 2020

(87) PCT Pub. No.: WO2020/242035
PCT Pub. Date: Dec. 3, 2020

(65) Prior Publication Data
US 2021/0249712 A1    Aug. 12, 2021

(30) Foreign Application Priority Data

May 30, 2019 (KR) .................. 10-2019-0063999
Jun. 10, 2019 (KR) .................. 10-2019-0068053

(51) Int. Cl.
*H01M 10/613* (2014.01)
*H01M 10/6557* (2014.01)
(Continued)

(52) U.S. Cl.
CPC ..... *H01M 10/6557* (2015.04); *H01M 10/486* (2013.01); *H01M 10/613* (2015.04);
(Continued)

(58) Field of Classification Search
CPC .......... H01M 10/6557; H01M 10/613; H01M 10/627; H01M 10/63
See application file for complete search history.

(56) References Cited

U.S. PATENT DOCUMENTS 5,756,227 A    5/1998  Suzuki et al.
2009/0253029 A1  10/2009  Inoue
(Continued)

FOREIGN PATENT DOCUMENTS

CN    108023138 A    5/2018
CN    112018287 A    12/2020
(Continued)

OTHER PUBLICATIONS

International Search Report for PCT/KR2020/004477 dated Jul. 17, 2020.
(Continued)

*Primary Examiner* — Olatunji A Godo
(74) *Attorney, Agent, or Firm* — Birch, Stewart, Kolasch & Birch, LLP (57) ABSTRACT

A battery module includes a unit module stack formed by stacking a plurality of unit modules, each unit module having a plurality of battery cells stacked on each other; a swelling absorption pad interposed between the unit modules adjacent to each other; and a module housing configured to accommodate the unit module stack and the swelling absorption pad, wherein the swelling absorption pad has a coolant channel formed to extend along a longitudinal direction thereof.

20 Claims, 7 Drawing Sheets

(51) Int. Cl.
*H01M 10/627* (2014.01)
*H01M 10/63* (2014.01)
*H01M 10/6563* (2014.01)
*H01M 10/6567* (2014.01)
*H01M 50/24* (2021.01)
*H01M 10/48* (2006.01)

(52) U.S. Cl.
CPC ......... *H01M 10/627* (2015.04); *H01M 10/63* (2015.04); *H01M 10/6563* (2015.04); *H01M 10/6567* (2015.04); *H01M 50/24* (2021.01); *H01M 2220/10* (2013.01)

(56) References Cited

U.S. PATENT DOCUMENTS

| | | | |
|---|---|---|---|
| 2011/0052960 | A1 | 3/2011 | Kwon et al. |
| 2011/0236730 | A1* | 9/2011 | Jones ................ H01M 50/60 429/50 |
| 2013/0252063 | A1 | 9/2013 | Park |
| 2015/0200429 | A1 | 7/2015 | Lee et al. |
| 2015/0260090 | A1 | 9/2015 | Hsieh et al. |
| 2016/0164061 | A1* | 6/2016 | Han ................ H01M 50/20 429/120 |
| 2017/0200993 | A1 | 7/2017 | Song et al. |
| 2017/0279164 | A1* | 9/2017 | Herrema ............ H01M 50/60 |
| 2018/0034021 | A1 | 2/2018 | Yamamoto et al. |
| 2018/0123200 | A1 | 5/2018 | Golubkov |
| 2018/0145295 | A1 | 5/2018 | Sohn et al. |
| 2018/0289996 | A1 | 10/2018 | Kim et al. |
| 2019/0051957 | A1 | 2/2019 | Lee et al. |
| 2019/0237833 | A1 | 8/2019 | Kulp et al. |
| 2021/0249712 | A1 | 8/2021 | Lee |

FOREIGN PATENT DOCUMENTS

| | | | |
|---|---|---|---|
| EP | 1111215 | A | 6/2001 |
| JP | 8-148187 | A | 6/1996 |
| JP | 10-208781 | A | 8/1998 |
| JP | 2000-48867 | A | 2/2000 |
| JP | 2003-346922 | A | 12/2003 |
| JP | 2009-252417 | A | 10/2009 |
| JP | 2011-96465 | A | 5/2011 |
| JP | 2012-104225 | A | 5/2012 |
| JP | 2012-104499 | A | 5/2012 |
| JP | 2013-48082 | A | 3/2013 |
| JP | 2013-62207 | A | 4/2013 |
| JP | 2013-131416 | A | 7/2013 |
| JP | 2013-161635 | A | 8/2013 |
| JP | 2014-60012 | A | 4/2014 |
| JP | 2014-127403 | A | 7/2014 |
| JP | 2014-216248 | A | 11/2014 |
| JP | 2015-220177 | A | 12/2015 |
| JP | 2016-2419 | A | 1/2016 |
| JP | 2018-18755 | A | 2/2018 |
| JP | 2018-55768 | A | 4/2018 |
| JP | 2018-113097 | A | 7/2018 |
| JP | 2018-133134 | A | 8/2018 |
| JP | 2019-514159 | A | 5/2019 |
| KR | 10-1995-0015887 | A | 6/1995 |
| KR | 10-2011-0024954 | A | 3/2011 |
| KR | 10-2013-0033597 | A | 4/2013 |
| KR | 10-2017-0084606 | A | 7/2017 |
| KR | 10-2017-0135476 | A | 12/2017 |
| KR | 10-2018-0056219 | A | 5/2018 |
| KR | 10-2018-0060762 | A | 6/2018 |
| KR | 10-2018-0068259 | A | 6/2018 |
| WO | WO 2018/065171 | A1 | 4/2018 |
| WO | WO 2018/164623 | A1 | 9/2018 |

OTHER PUBLICATIONS

Machine translation of JP-2000-48867-A, published on Feb. 18, 2000.
Partial Supplementary European Search Report for European Application No. 20815309.8, dated Nov. 5, 2021.

* cited by examiner

BATTERY MODULE HAVING PATH THROUGH WHICH COOLANT INTRODUCED THEREIN FLOWS WHEN THERMAL RUNAWAY OCCURS, AND BATTERY PACK AND ESS COMPRISING THE SAME

TECHNICAL FIELD

The present disclosure relates to a battery module having a path through which a coolant introduced therein may flow when a thermal runaway phenomenon occurs, a battery pack and an energy storage system (ESS) including the battery module, and more specifically, to a battery module having a structure in which a coolant introduced therein may smoothly move between unit modules adjacent to each other when water is injected into a battery module at which a thermal runaway phenomenon occurs, and a battery pack and an ESS including the battery module.

The present application claims priority to Korean Patent Application No. 10-2019-0063999 filed on May 30, 2019 in the Republic of Korea, the disclosures of which are incorporated herein by reference.

The present application claims priority to Korean Patent Application No. 10-2019-0068053 filed on Jun. 10, 2019 in the Republic of Korea, the disclosures of which are incorporated herein by reference.

BACKGROUND ART

In a battery module that includes a plurality of battery cells, if an abnormality such as a short circuit occurs in some battery cells to raise temperature continuously so that the temperature of the battery cell exceeds a critical temperature, a thermal runaway phenomenon occurs. If a thermal runaway phenomenon occurs in some battery cells as described above, safety issues may be generated.

If a flame or the like is generated due to the thermal runaway phenomenon occurring in some battery cells, the flame rapidly raises the temperature of adjacent battery cells, and thus the thermal runaway phenomenon may be propagated to adjacent cells within a short time.

Eventually, if the thermal runaway phenomenon occurring in some battery cells is not quickly responded, it may lead to disasters such as ignition and explosion of a battery module or a battery pack, which is a battery unit with a greater capacity than the battery cell, and this may not only result in property damage but also cause safety problems.

Thus, if a flame occurs due to the thermal runaway phenomenon in some battery cells inside the battery module, it is urgently necessary to quickly lower the temperature inside the battery module to prevent the flame from spreading further.

A cell stack accommodated inside the battery module has a structure in which a pad for securing a space capable of absorbing swelling is interposed between every adjacent unit modules, using a certain number of battery cells as one unit module.

In the battery module having the above structure, if a thermal runaway phenomenon occurs therein, even though a coolant is introduced into the battery module, the coolant may not flow smoothly between adjacent unit modules due to the pad.

Therefore, it is demanded to develop a battery module having a structure capable of ensuring a smooth flow of coolant while employing the pad-inserted structure.

In addition, a battery module adopting an air-cooled structure has an air channel through which a coolant leaks without staying inside even though the coolant is introduced to lower the temperature inside the battery module and extinguish the flame. Thus, it is demanded to develop a battery pack having a structure capable of blocking the air channel when a coolant is introduced into a battery module where a thermal runaway phenomenon has occurred.

DISCLOSURE

Technical Problem

The present disclosure is designed to solve the problems of the related art, and therefore the present disclosure is directed to preventing a flame from spreading greatly by rapidly lowering the temperature inside a battery module when the flame is generated in some battery cells in the battery module due to a thermal runaway phenomenon.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a unit module stack formed by stacking a plurality of unit modules, each unit module having a plurality of battery cells stacked on each other; a swelling absorption pad interposed between the unit modules adjacent to each other; and a module housing configured to accommodate the unit module stack and the swelling absorption pad, wherein the swelling absorption pad has a coolant channel formed to extend along a longitudinal direction thereof.

The coolant channel may include an input port provided to one side of the swelling absorption pad in the longitudinal direction; an output port provided to the other side of the swelling absorption pad in the longitudinal direction; and a cooling portion configured to connect the input port and the output port to each other and having a greater sectional area than the input port and the output port.

The coolant channel may have an opened shape such that a coolant flowing through the coolant channel directly contacts a pair of battery cells in contact with the swelling absorption pad.

The input port may be located higher than the output port.

The module housing may include an air inlet formed through the module housing at a first side of the unit module stack in a stacking direction; and an air outlet med through the module housing at a second side of the unit module stack in the stacking direction.

The battery module may include an expansion pad disposed inside the air inlet and the air outlet and configured to expand due to the contact with a coolant introduced into the battery module to close the air inlet and the air outlet.

The battery module may include a pair of bus bar frames respectively coupled to a first side and a second side of the unit module stack in a width direction.

The air inlet and the air outlet may be formed at locations corresponding an empty space formed between each of the pair of bus bar frames and the module housing.

The battery module may include a coolant tube insert hole formed through the module housing to communicate with an empty space formed between each of the pair of bus bar frames and the module housing.

A battery pack according to an embodiment of the present disclosure includes a plurality of battery modules according to an embodiment of the present disclosure as described above.

An energy storage system (ESS) according to an embodiment of the present disclosure includes a plurality of battery modules according to an embodiment of the present disclosure as described above.

Advantageous Effects

According to one aspect of the present disclosure, when a flame is generated in some battery cells inside the battery module due to a thermal runaway phenomenon, it is possible to prevent the flame from spreading further by lowering the temperature inside the battery module quickly. That is, it is possible to quickly lower the temperature inside the battery module by solving the problem that a coolant is not able to flow smoothly between adjacent unit modules due to a pad when the coolant is introduced into the battery module having a structure in which the pad for absorbing swelling is interposed between adjacent unit modules.

In addition, according to another aspect of the present disclosure, in a battery pack including an air-cooled battery module, when a coolant is introduced into the battery module where a thermal runaway phenomenon occurs, it is possible to effectively prevent the thermal runaway phenomenon from propagating by adopting a structure in which the air channel for cooling is blocked so that the coolant stays inside the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
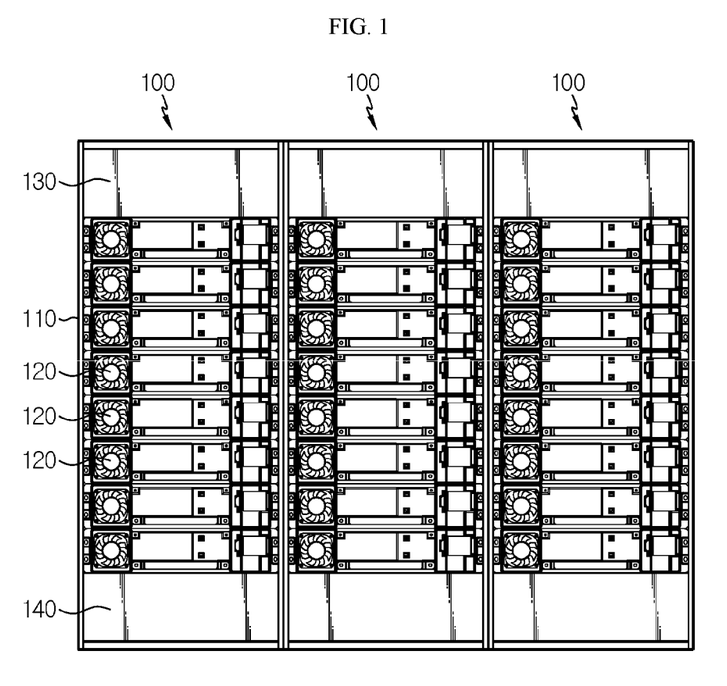
FIG. 1 is a diagram showing an energy storage system (ESS) according to an embodiment of the present disclosure.

Referring to FIG. 1, an energy storage system (ESS) according to an embodiment of the present disclosure includes a plurality of battery packs 100 according to an embodiment of the present disclosure.

Figure 2:
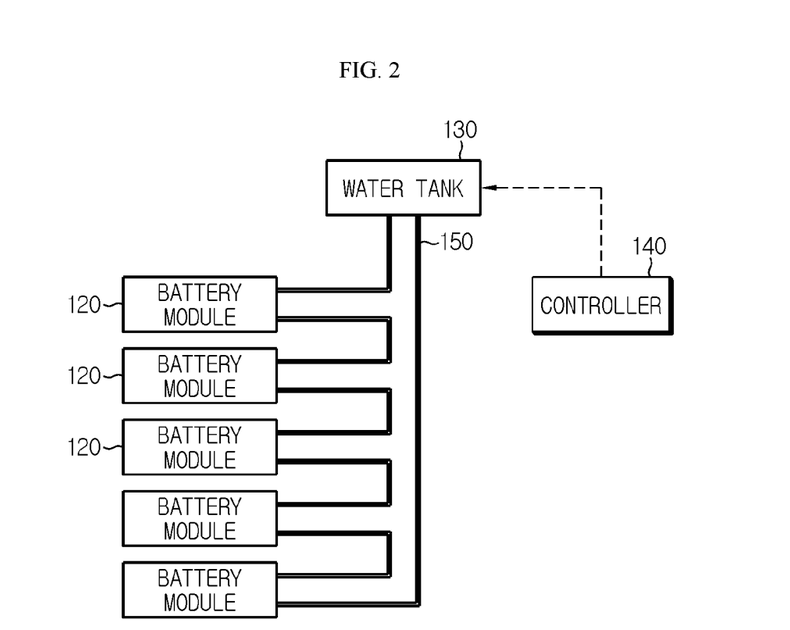
FIG. 2 is a diagram for illustrating the connection structure between a water tank and a battery module and the relationship between the water tank and a controller, in a battery pack according to an embodiment of the present disclosure.
Figure 3:
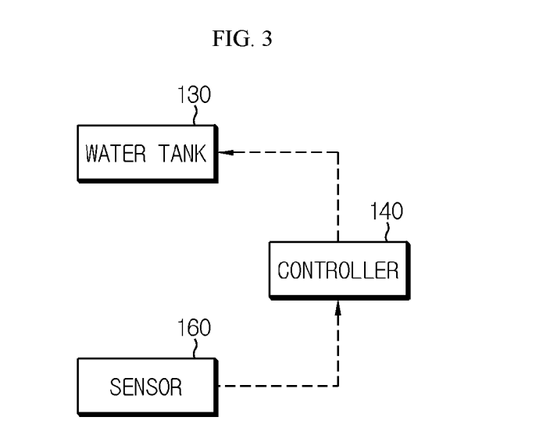
FIG. 3 is a diagram for illustrating the relationship among a sensor, the controller and the water tank, in the battery pack according to an embodiment of the present disclosure.

Referring to FIGS. 1 to 3, the battery pack 100 according to an embodiment of the present disclosure includes a pack housing 110, a battery module 120, a water tank 130, a controller 140, a coolant tube 150 and a sensor 160.

The pack housing 110 is an approximately rectangular frame that defines the appearance of the battery pack 100, and has a space formed therein so that the plurality of battery modules 120, the water tank 130, the controller 140, the coolant tube 150 and the sensor 160 may be installed therein.

The battery module 120 is provided in plural, and the plurality of battery modules 120 are vertically stacked in the pack housing 110 to form a single module stack. The specific structure of the battery module 120 will be described later in detail with reference to FIGS. 4 to 10.

The water tank 130 is provided inside the pack housing 110 and stores a coolant that is to be supplied to the battery module 120 when a thermal runaway phenomenon occurs at the battery module 120. The water tank 130 may be disposed above the module stack for quick and smooth supply of coolant. In this case, even though a separate coolant pump is not used, the coolant may be rapidly supplied into the battery module 120 by free fall and water pressure of the coolant. Of course, a separate coolant pump may also be applied to the water tank 130 to supply the coolant more quickly and smoothly.

The controller 140 may be connected to the sensor 160 and the water tank 130 and output a control signal to open the water tank 130 according to the sensing signal of the sensor 160. In addition, the controller 140 may additionally perform a function as a battery management system (BMS) that is connected to each battery module 120 to manage charging and discharging thereof, in addition to the above function.

The controller 140 outputs a control signal to open the water tank 130 when detecting gas or a temperature rise above a reference value inside the battery pack 100 due to a thermal runaway phenomenon occurring in at least one of the plurality of battery modules 120, and allows the coolant to be supplied into the battery module 120 accordingly.

If the water tank 130 is opened according to the control signal of the controller 140, the coolant is sequentially supplied from a battery module 120 located at a relatively upper portion to a battery module 120 located at a relatively lower portion. Thus, the flame in the battery modules 120 is extinguished and also the battery modules 120 are cooled, thereby preventing the thermal runaway phenomenon from spreading throughout the battery pack 100.

The coolant tube 150 connects the water tank 130 and the battery module 120 to each other, and functions as a passage for carrying the coolant supplied from the water tank 130 to the battery module 120. To perform this function, one end of the coolant tube 150 is connected to the water tank 130, and the other end of the coolant tube 150 is branched by the number of the battery modules 120 and connected to the plurality of battery modules 120, respectively.

If the thermal runaway phenomenon occurs in at least a part of the plurality of battery modules 120 as described above, the sensor 160 detects a temperature rise and/or a gas ejection and transmits a detection signal to the controller 140. To perform this function, the sensor 160 may be a temperature sensor or a gas detection sensor, or a combination of the temperature sensor and the gas detection sensor.

The sensor 160 is installed inside the pack housing 110 to detect temperature rise or gas generation inside the battery pack 100. The sensor 160 may be attached to an inner side or outer side of each of the plurality of battery modules 120 to quickly sense the temperature of the battery module 120 and/or gas generated from the battery module 120.

Next, the battery module 120 applied to the battery pack 100 according to an embodiment of the present disclosure will be described in more detail with reference to FIGS. 4 to 10.

Referring to FIGS. 4 to 10, the battery module 120 may be implemented to include a plurality of battery cells 121, a bus bar frame 122, a module housing 123, an air inlet 124, an air outlet 125 and an expansion pad 127. In addition, the battery module 120 may further include a swelling absorption pad 126 in addition to the above components.

Figure 6:
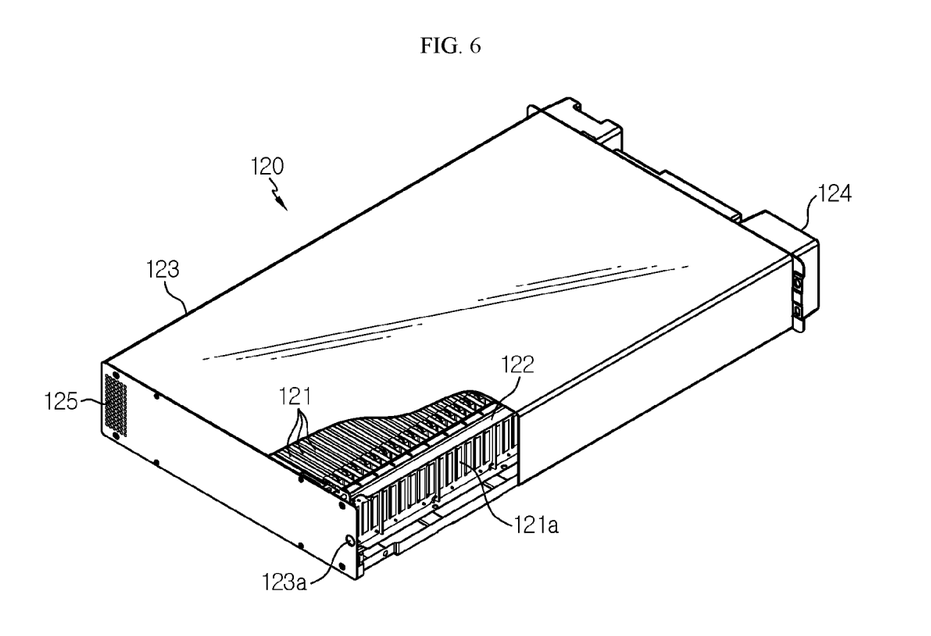
FIGS. 6 and 7 are diagrams showing an inner structure of the battery module applied to the battery pack according to an embodiment of the present disclosure.
Figure 7:
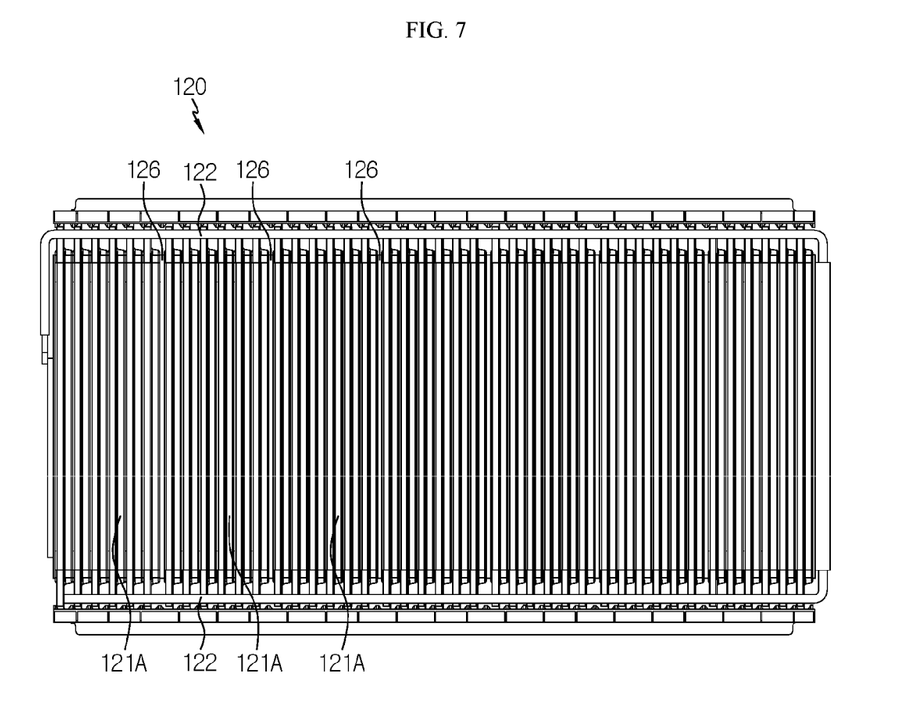

The battery cell 121 is provided in plural, and the plurality of battery cells 121 are stacked to form one unit module 121A. Also, a plurality of unit modules 121A are stacked to form a single unit module stack. As the battery cell 121, for example, a pouch-type battery cell may be applied. The battery cell 121 includes a pair of electrode leads 121a respectively drawn out at both sides thereof in a longitudinal direction.

The bus bar frame 122 is provided in a pair, and the pair of bus bar frames 122 cover one side and the other side of the unit module stack in a width direction. The electrode lead 121a of the battery cell 121 is drawn through a slit formed at the bus bar frame 122, and is bent and fixed by welding or the like onto the bus bar frame 122. That is, the plurality of battery cells 121 may be electrically connected by the bus bar frame 122.

Figure 4:
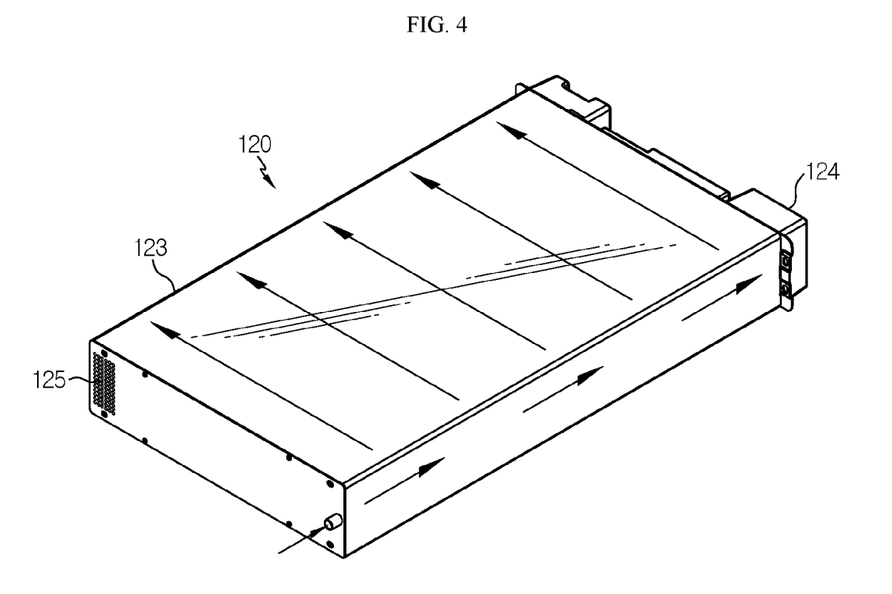
FIGS. 4 and 5 are perspective views showing a battery module applied to the battery pack according to an embodiment of the present disclosure.
Figure 5:
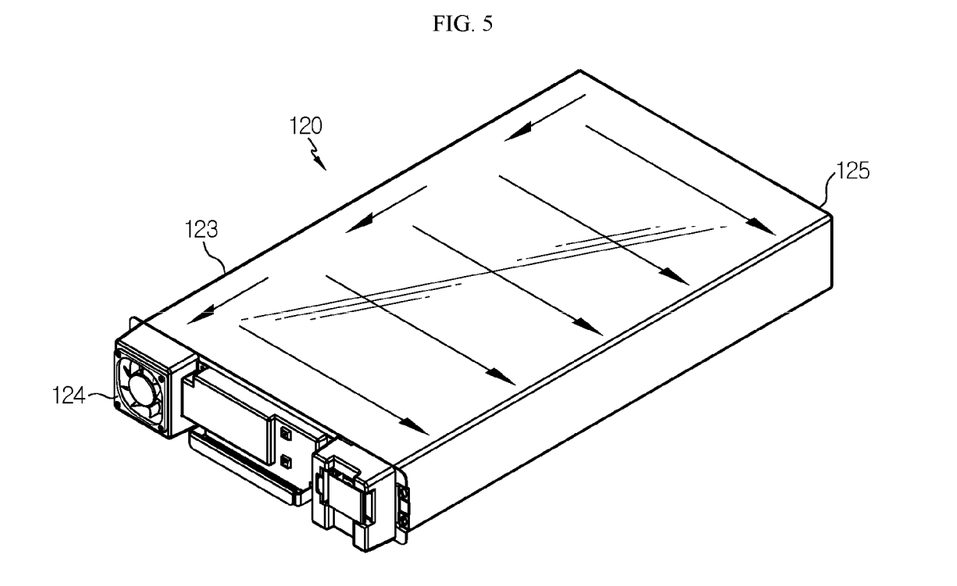

The module housing 123 has a substantially rectangular parallelepiped shape, and accommodates the unit module stack therein. The air inlet 124 and the air outlet 125 are formed at one side and the other side of the module housing 123 in the longitudinal direction.

The air inlet 124 is formed at one side of the module stack in the stacking direction, namely at one side of the battery module 120 in the longitudinal direction and has a hole shape formed through the module housing 123. The air outlet 125 is formed at the other side of the module stack in the stacking direction, namely at the other side of the battery module 120 in the longitudinal direction and is has a hole shape formed through the module housing 123.

The air inlet 124 and the air outlet 125 are located at diagonally opposite sides along the longitudinal direction of the battery module 120.

Meanwhile, an empty space is formed between the bus bar frame 122 and the module housing 123. That is, the empty space in which air for cooling the battery cell 121 flows is formed between one of six surfaces of the module housing 123 facing one side and the other side of the battery cell 121 in the longitudinal direction and the bus bar frame 122. The empty space is formed at each of both sides of the battery module 120 in the width direction.

The air inlet 124 is formed at a location corresponding to the empty space formed at one side of the battery module 120 in the width direction, and the air outlet 125 is formed at a location corresponding to the empty space formed at the other side of the battery module 120 in the width direction.

In the battery module 120, the air introduced therein through the air inlet 124 cools the battery cell 121 while moving from the empty space formed at one side of the battery module 120 in the width direction to the empty space formed at the other side of the battery module 120 in the width direction, and then goes out of the battery module 120 through the air outlet 125. That is, the battery module 120 corresponds to an air-cooled battery module.

The coolant tube 150 passes through the module housing 123 from one side or the other side of the module stack in the stacking direction and communicates with the empty space formed between the bus bar frame 122 and the module housing 123. A coolant tube insert hole 123a into which the coolant tube 150 may be inserted is formed at a surface among six surfaces of the module housing 123, where the air inlet 124 or the air outlet 125 is formed. The coolant tube insert hole 123a communicates with the empty space, and the coolant tube 150 is inserted into the battery module 120 through the coolant tube insert hole 123a. The coolant tube insert hole 123a may be formed at a side opposite to the air inlet 124 or the air outlet 125 along the width direction of the battery module 120.

The coolant introduced into the battery module 120 through the coolant tube 150 flows from the empty space formed at one side of the battery module 120 in the width direction to the empty space formed at the other side of the battery module 120 in the width direction to fill the inside of the battery module 120, as is shown in FIGS. 4 and 5.

Figure 8:
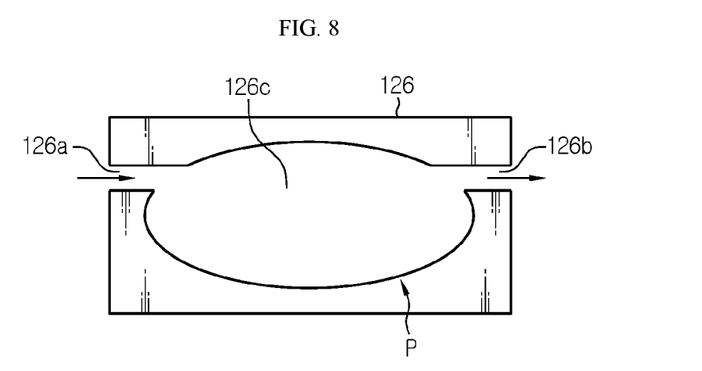
FIGS. 8 and 9 are diagrams showing a detailed structure of a swelling absorption pad applied to the battery module according to an embodiment of the present disclosure.
Figure 9:
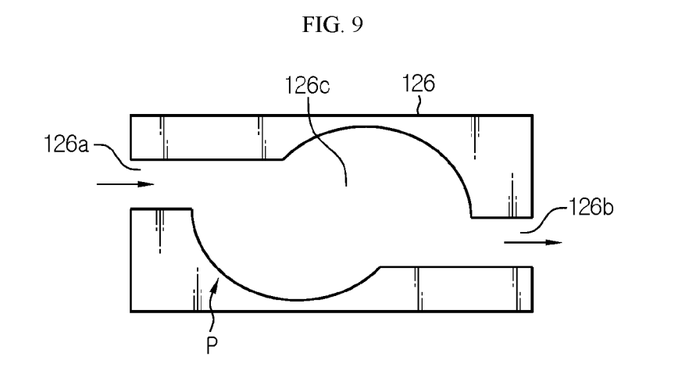

Referring to FIGS. 7 to 9, the battery module 120 may include a swelling absorption pad 126 interposed between unit modules 121A of the module stack. The swelling absorption pad 126 may include, for example, materials such as silicon, graphite, expanded polypropylene (EPP), expanded polystyrene (EPS), and the like, and has elasticity to absorb volume expansion of the battery cell 121 caused by swelling.

Referring to FIGS. 7 and 8, the swelling absorption pad 126 includes a coolant channel P that provides a path through which the coolants may flow, so that the coolant may cool the battery cell 121 while passing between unit modules 121A adjacent to each other.

The coolant channel P includes an input port 126a formed at one side of the swelling absorption pad 126 in the longitudinal direction, an output port 126b formed at the other side of the swelling absorption pad 126 in the longitudinal direction, and a cooling portion 126c connecting the input port 126a and the output port 126b to each other.

The coolant channel P has an opened shape so that the coolant flowing through the coolant channel P directly contacts the pair of battery cells 121 in contact with the swelling absorption pad 126.

The coolant flowing into the empty space formed at one side of the battery module 120 in the width direction sequentially passes through the input port 126a, the cooling portion 126c and the output port 126b, and moves to the empty space formed at the other side of the battery module 120 in the width direction to come into contact with the battery cell 121, thereby cooling the battery cell 121.

The cooling portion 126c has a greater sectional area than the input port 126a and the output port 126b so that the coolant entering between the battery cells 121 adjacent to each other through the input port 126a may stay as long as possible.

As a result, the coolant introduced through the input port 126a has a slow flow rate in the cooling portion 126c and has sufficient time to contact the battery cell 121. After completely exchanging heat with the battery cell 121, the coolant exits through the output port 126b.

Meanwhile, referring to FIG. 9, the input port 126a may be located higher than the output port 126b. If the input port 126a may be located higher than the output port 126b as described above, the coolant may flow more smoothly, thereby improving the cooling efficiency.

Figure 10:
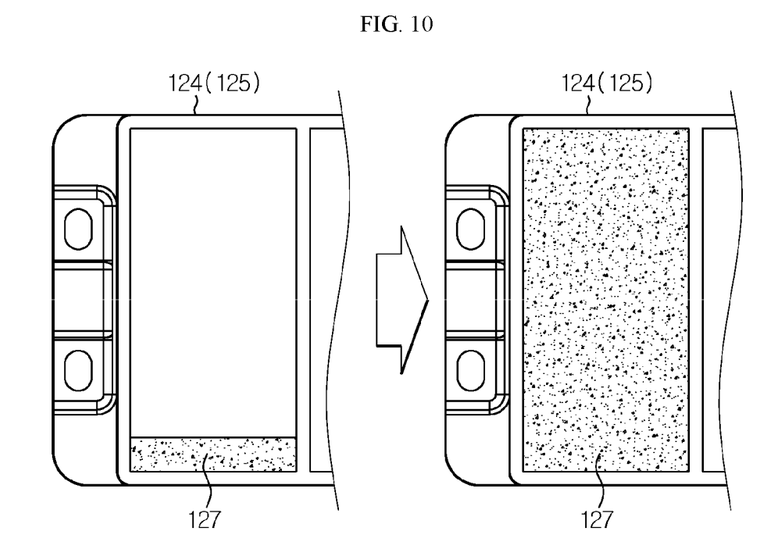
FIG. 10 is a diagram showing an expansion pad applied to the battery pack according to an embodiment of the present disclosure.

Referring to FIG. 10, the expansion pad 127 is disposed inside the air inlet 124 and the air outlet 125, and has a size smaller than the opened area of the air inlet 124 and the air outlet 125. The expansion pad 127 preferably has a size of less than 30% compared to the opened area of the air inlet 124 and air outlet 125 so that the air may flow through the air inlet 124 and the air outlet 125 smoothly when the battery module 120 is normally used.

The expansion pad 127 is expanded by contacting the coolant introduced into the battery module 120 to close the air inlet 124 and the air outlet 125. The expansion pad 126 contains a resin that exhibits a very large expansion rate when absorbing moisture, for example a resin that increases in volume by at least two times or more compared to the initial volume when a sufficient amount of moisture is provided thereto. As a resin used for the expansion pad 127, a polyester staple fiber is mentioned, for example.

By applying the expansion pad 127, when a thermal runaway phenomenon occurs in at least some battery modules 120 and thus a coolant is introduced into the battery modules 120, the air inlet 124 and the air outlet 125 are closed. If the air inlet 124 and the air outlet 125 are closed as above, the coolant introduced into the battery module 120 does not escape to the outside but stays inside the battery modules 120, thereby quickly resolving the thermal runaway phenomenon occurring in the battery modules 120.

Figure 11:
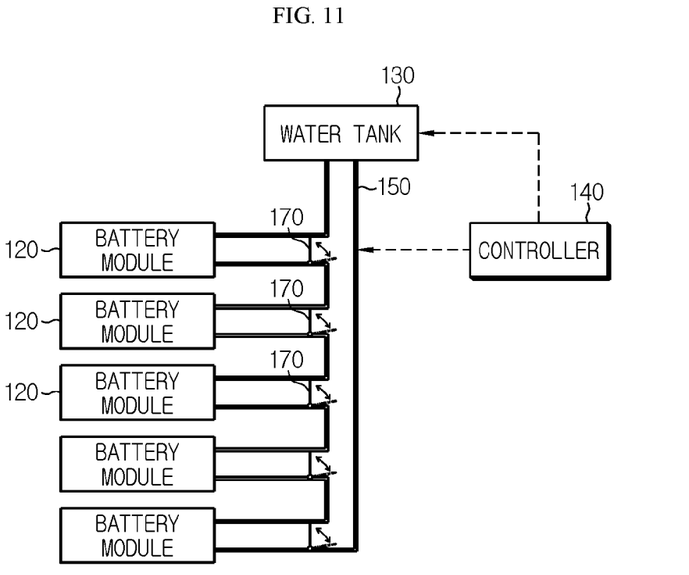
FIG. 11 is a diagram for illustrating the connection structure between a water tank and a battery module and the relationship among a valve, a controller and the water tank, in a battery pack according to another embodiment of the present disclosure.

Next, a battery pack according to another embodiment of the present disclosure will be described with reference to FIG. 11.

The battery pack according to another embodiment of the present disclosure is different from the battery pack 100 according to an embodiment of the present disclosure described above only in the point that a valve 170 is installed inside the coolant tube 150, and other components are substantially the same.

Thus, the battery pack according to another embodiment of the present disclosure will be described based on the valve 170, and the features identical to the former embodiment will not be described in detail.

The valve 170 is provided in plural as much as the number of the plurality of battery modules 120, and the valves 170 are respectively installed adjacent to the plurality of battery modules 120 to individually allow or block the flow of coolant flowing into the plurality of battery modules 120.

As described above, in order to operate the plurality of valves 170 independently, at least one sensor 160 is provided for each battery module 120. Thus, if the sensor 160 is provided for every battery module 120, it is possible to input the coolant only to some battery modules 120 in which a thermal runaway phenomenon occurs.

That is, if the controller 140 receives a detection signal from some sensors 160, the controller 140 determines that a thermal runaway phenomenon occurs in the battery modules 120 to which the sensors 160 sending the detection signal are attached, and opens the valves 170 installed adjacent to the battery modules 120 where the thermal runaway phenomenon occurs among the plurality of valves 170 so that the coolant may be put thereto.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a unit module stack formed by stacking a plurality of unit modules, each unit module having a plurality of battery cells stacked on each other in a first direction;
a swelling absorption pad interposed between the unit modules adjacent to each other; and
a module housing configured to accommodate the unit module stack and the swelling absorption pad,
wherein the swelling absorption pad has a coolant channel formed to extend along a longitudinal direction thereof,
wherein the coolant channel includes:
an input port provided to one side of the swelling absorption pad in the longitudinal direction;
an output port provided to the other side of the swelling absorption pad in the longitudinal direction; and
a cooling portion configured to connect the input port and the output port to each other and having a greater sectional area than the input port and the output port,
wherein the input port is located higher than the output port.

2. The battery module according to claim 1, wherein the coolant channel has an opened shape such that a coolant flowing through the coolant channel directly contacts a pair of battery cells in contact with the swelling absorption pad.

3. The battery module according to claim 1, wherein the module housing includes:
an air inlet formed through the module housing at a first side of the unit module stack in a stacking direction; and
an air outlet formed through the module housing at a second side of the unit module stack in the first direction.

4. The battery module according to claim 3, further comprising an expansion pad disposed inside the air inlet and the air outlet and configured to expand due to the contact with a coolant introduced into the battery module to close the air inlet and the air outlet.

5. The battery module according to claim 4, further comprising a pair of bus bar frames respectively coupled to a first side and a second side of the unit module stack.

6. The battery module according to claim 5, wherein the air inlet and the air outlet are formed at locations corresponding to an empty space formed between each of the pair of bus bar frames and the module housing.

7. The battery module according to claim 5, further comprising a coolant tube insert hole formed through the module housing to communicate with an empty space formed between each of the pair of bus bar frames and the module housing.

8. A battery pack, comprising:
a pack housing;

a plurality of battery modules stacked in the pack housing;

a water tank disposed above a module stack including the plurality of battery modules and configured to store a coolant;

a coolant tube configured to connect the water tank and the plurality of battery modules to each other;

at least one sensor installed inside the pack housing to detect a thermal runaway phenomenon occurring in at least a part of the plurality of battery modules; and a controller configured to output a control signal for introducing the coolant into the plurality of battery modules through the coolant tube when a thermal runaway phenomenon is detected by the sensor.

9. The battery pack according to claim 8, wherein the battery pack includes a plurality of valves installed in the coolant tube, and wherein the plurality of valves are respectively installed adjacent to the plurality of battery modules of the module stack to individually allow or block the flow of the coolant introduced into the plurality of battery modules.

10. The battery pack according to claim 9, wherein the sensor is a plurality of sensors respectively installed to each of the plurality of battery modules.

11. The battery pack according to claim 10, wherein the controller is configured to output a control signal for opening a valve of the plurality of valves installed adjacent to a battery module in which the thermal runaway phenomenon is detected by the sensor.

12. The battery pack according to claim 8, wherein each of the plurality of battery modules includes:

a unit module stack formed by stacking a plurality of unit modules, each unit module having a plurality of battery cells stacked on each other;

a swelling absorption pad interposed between the unit modules adjacent to each other; and a module housing configured to accommodate the unit module stack and the swelling absorption pad, wherein the swelling absorption pad has a coolant channel formed to extend along a longitudinal direction thereof.

13. The battery pack according to claim 12, wherein the coolant channel includes:

an input port provided to one side of the swelling absorption pad in the longitudinal direction;

an output port provided to the other side of the swelling absorption pad in the longitudinal direction; and a cooling portion configured to connect the input port and the output port to each other and having a greater sectional area than the input port and the output port.

14. The battery pack according to claim 12, wherein the coolant channel has an opened shape such that a coolant flowing through the coolant channel directly contacts a pair of battery cells in contact with the swelling absorption pad.

15. The battery pack according to claim 13, wherein the input port is located higher than the output port.

16. An energy storage system (ESS), comprising a plurality of battery modules according to claim 1.

17. The battery pack according to claim 8, wherein each battery module includes a plurality of battery cells, each of the plurality of battery cells including a pair of electrode leads.

18. The battery pack according to claim 8, wherein the at least one sensor is a temperature sensor or a gas detection sensor.

19. The battery pack according to claim 8, wherein each of the module housings houses a plurality of battery cells, and wherein the coolant tube communicates with an empty space formed between each of the module housings and the plurality of battery cells in each of the module housings.

20. The battery module according to claim 1, wherein a sidewall of the coolant channel is formed by the swelling absorption pad.

* * * * *